(12) United States Patent
Becker

(10) Patent No.: US 8,594,230 B2
(45) Date of Patent: Nov. 26, 2013

(54) SYSTEM AND METHOD FOR CONSTRUCTING UNIQUE WORD SETS FOR EFFICIENT DETECTION USING ORTHOGONAL FUNCTIONS

(75) Inventor: Neal Becker, Frederick, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

(21) Appl. No.: 13/407,684

(22) Filed: Feb. 28, 2012

(65) Prior Publication Data

US 2013/0223558 A1    Aug. 29, 2013

(51) Int. Cl.
*H04L 27/00* (2006.01)

(52) U.S. Cl.
USPC ........... 375/295; 375/219; 375/220; 375/267; 375/299; 455/101; 455/132; 455/500; 455/562.1; 370/334; 341/173

(58) Field of Classification Search
USPC .......... 375/219, 220, 267, 295, 299; 455/101, 455/132, 500, 562.1; 370/334; 341/173
See application file for complete search history.

(56) References Cited

U.S. PATENT DOCUMENTS 7,436,896 B2 * 10/2008 Hottinen et al. .............. 375/267

* cited by examiner

*Primary Examiner* — Leon Flores
(74) *Attorney, Agent, or Firm* — Potomac Technology Law, LLC

(57) ABSTRACT

A system and method of construction of unique word sets together with an efficient method of implementing correlation with the members of the set is presented. The set of UWs is constructed by breaking a UW sequence in to equal length segments, and then multiplying this vector by an orthogonal matrix. First an arbitrary vector U is chosen of length K for a set of N UWs. Then a matrix H of size N×N is chosen. The columns of H are then repeated L times to form a matrix H'. The set of N UW consists of the rows of $H'U^T$. N sub-correlations of the N segments of the vector U with the segments of the (suitably delayed) received signal is performed at the receiver. Then the N different outputs are obtained as $Z=HC^T$, where $C=[C_0 \ldots C_{N-1}]$ is the vector of correlated outputs. The receiver only requires N correlators, each of length L, instead of length K, which provides a less complex and more efficient solution for detection of UW sets.

8 Claims, 6 Drawing Sheets

SYSTEM AND METHOD FOR CONSTRUCTING UNIQUE WORD SETS FOR EFFICIENT DETECTION USING ORTHOGONAL FUNCTIONS

BACKGROUND

The present application relates to the field of digital communication systems, in particular, construction and detection of unique word sets in burst mode communication systems.

In conventional burst mode communication systems, a transmitter transmits burst mode signals at a certain frequency, phase and timing, which is received by a receiver through a communication channel. A conventional communication system is discussed below using FIG. 1.

FIG. 1 illustrates a conventional communication system 100.

As illustrated in the figure, conventional communication system 100 includes a transmitter 102, a receiver 104 and a communication channel 106.

Transmitter 102 transmits a burst signal 108 to receiver 104 via communication channel 106. Due to the noise introduced by communication channel 106, such as Additive White Gaussian Noise (AWGN), receiver 104 receives a noisy burst signal 110. Receiver 104 must process the noisy burst signal 110 in order to recover the information transmitted in burst signal 108.

In conventional burst mode communication systems, it is necessary to quickly estimate various parameters of the received bursts as they arrive. These parameters include detection of the presence of a burst (start time), frequency, initial phase, timing and amplitude. The term "Unique Word" (UW) refers to a known, pre-determined pattern (known a priori to the receiver) that is transmitted to allow the receiver to synchronize (perform estimation of the burst parameters). A conventional burst transmitted by transmitter 102 at a certain frequency, phase timing and amplitude, which is received by receiver 104 through communication channel 106 is discussed with the help of FIG. 2.

FIG. 2 illustrates a burst sequence for conventional communication system 100.

As illustrated in the figure, burst sequence 200 includes a frame 204, a frame 206 and a frame 208 sampled on an x-axis 202, which represents time in seconds.

Frame 204 includes a UW 210 and a payload 212. Frame 206 includes a UW 214 and a payload 216. Frame 208 includes a UW 218 and a payload 220. Unique word provides a mechanism for a receiver in a burst mode communication system to synchronize with each frame. Payload includes data and information desired by a transmitter in a burst mode communication system to be received and processed by the receiver.

In some systems, it is desirable for various reasons to have available not just a single known UW, but to use a set of UWs. The various UWs could be used to differentiate amongst various transmitters, or to convey other information about the transmission. A burst sequence including a set of UWs is discussed with the help of FIG. 3.

FIG. 3 illustrates a burst sequence with a set of UWs for conventional communication system 100.

As illustrated in the figure, a burst sequence 300 includes a frame 304, a frame 306, a frame 308, a frame 310, a frame 310 and a frame 314 sampled on an x-axis 302, which represents time in seconds. FIG. 3 further illustrates a correlator1 316, a correlator2 318, a correlator3 320 and a correlatorN 322.

Frame 304 includes a UW 324 and a payload 326. Frame 306 includes a UW 328 and a payload 330. Frame 308 includes a UW 332 and a payload 334. Frame 310 includes UW 328 and a payload 336. Frame 312 includes UW 324 and a payload 338. A plurality of additional number of UW/payload sets indicated by dots. Lastly, frame 314 includes a UW 340 and a payload 342.

As illustrated in FIG. 3, burst sequence 300 includes any one of the UWs from the set of UW 324, UW 328, UW 332 and UW 340. Each UW may be used to denote some information about the payload which follows. In one example, UW 324 denotes that FEC (Forward Error Correction) code rate for payload 326 is rate half, while UW 328 denotes that FEC code rate for payload 330 and payload 336 is rate two thirds.

Maximum likelihood detection of UWs in the presence of AWGN is done by correlation of the known transmitted signal with the noisy received signal. When a system uses a set of UWs, the receiver must correlate with all the members of the UW set. If N numbers of UWs are used, the receiver must perform N correlations.

In order to detect burst sequence 300 that includes a set of UWs, receiver 104 must have a separate correlator to detect each UW. As illustrated in FIG. 3, correlator1 316 is required for UW 324, correlator 318 is required for UW 328, correlator 320 is required for UW 332 and correlator 322 is required for UW 340. Correlators for the additional UW indicated as dots are not shown for purposes of brevity.

Each UW within a set of UWs in burst sequence 300 will contain different information. Receiver 104 must search for all the UWs at any given time without knowing which UW to expect. In order to perform maximum likelihood detection of UW 324, UW 328, UW 332, the other UW corresponding to the dots in the figure and UW 340 in the presence of AWGN, receiver 104 must perform N correlations. Each of the correlators can be computationally expensive. Hence, the complexity of this approach can become prohibitive.

What is needed is a system and method of constructing a set of UWs for efficient detection such that the correlations at the receiver can be simplified.

BRIEF SUMMARY

The present invention provides a system and method of constructing a set of UWs such that the UWs within the set are related in some manner so as to simplify the correlation operation.

In accordance with an aspect of the present invention, a system and method are provided for construction of unique word sets together with an efficient method of implementing correlation with the members of the set. The set of UWs is constructed by breaking a UW sequence in to equal length segments, and then multiplying this vector by an orthogonal matrix. First an arbitrary vector U is chosen of length K for a set of N UWs where K is the desired overall UW length. Then a matrix H of size N×N is chosen. The columns of H are then repeated L times to form a matrix H'. The set of N UW consists of N sub-correlations of the N segments of the vector U with the segments of the (suitably delayed) received signal is performed at the receiver. Then the N different outputs are obtained as $Z = HC^T$, where $C = [C_0 \ldots C_{N-1}]$ is the vector of correlated outputs. The receiver only requires N correlators, each of length L, instead of length K, which provides a less complex and more efficient solution for detection of UW sets.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
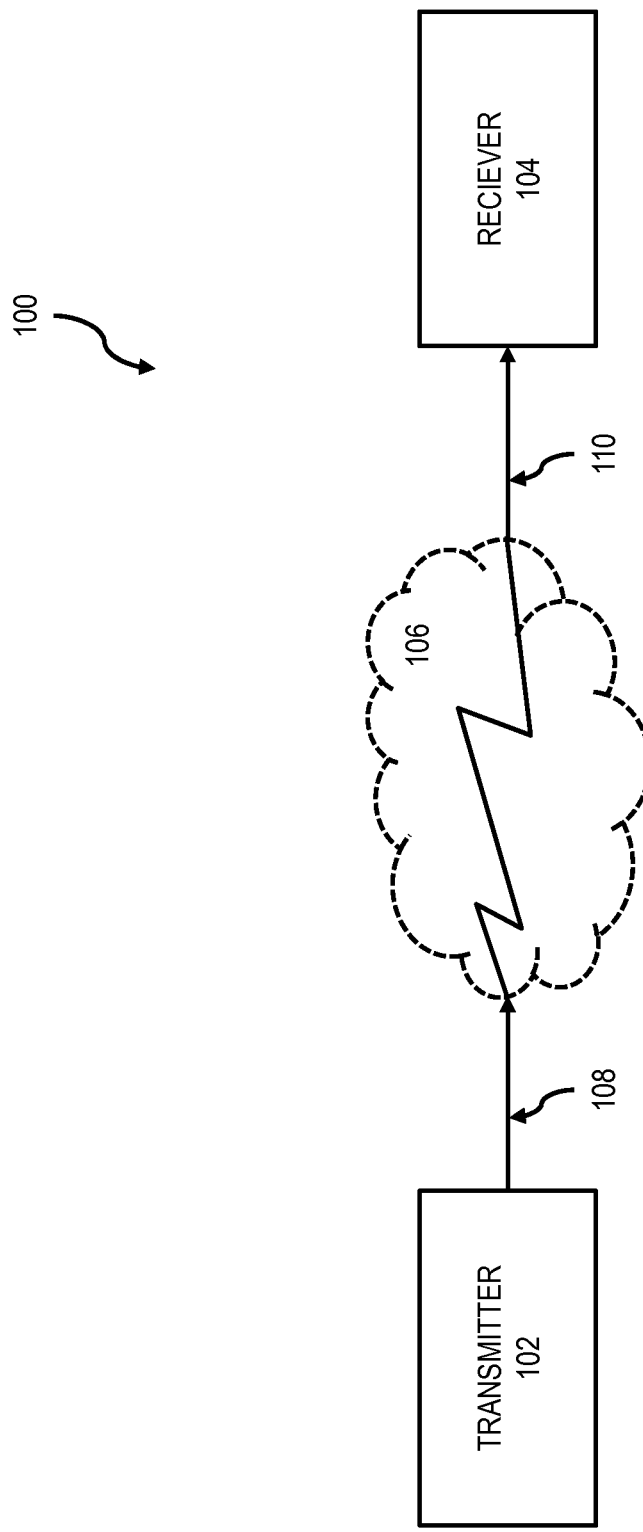
FIG. 1 illustrates a conventional communication system.
Figure 2:
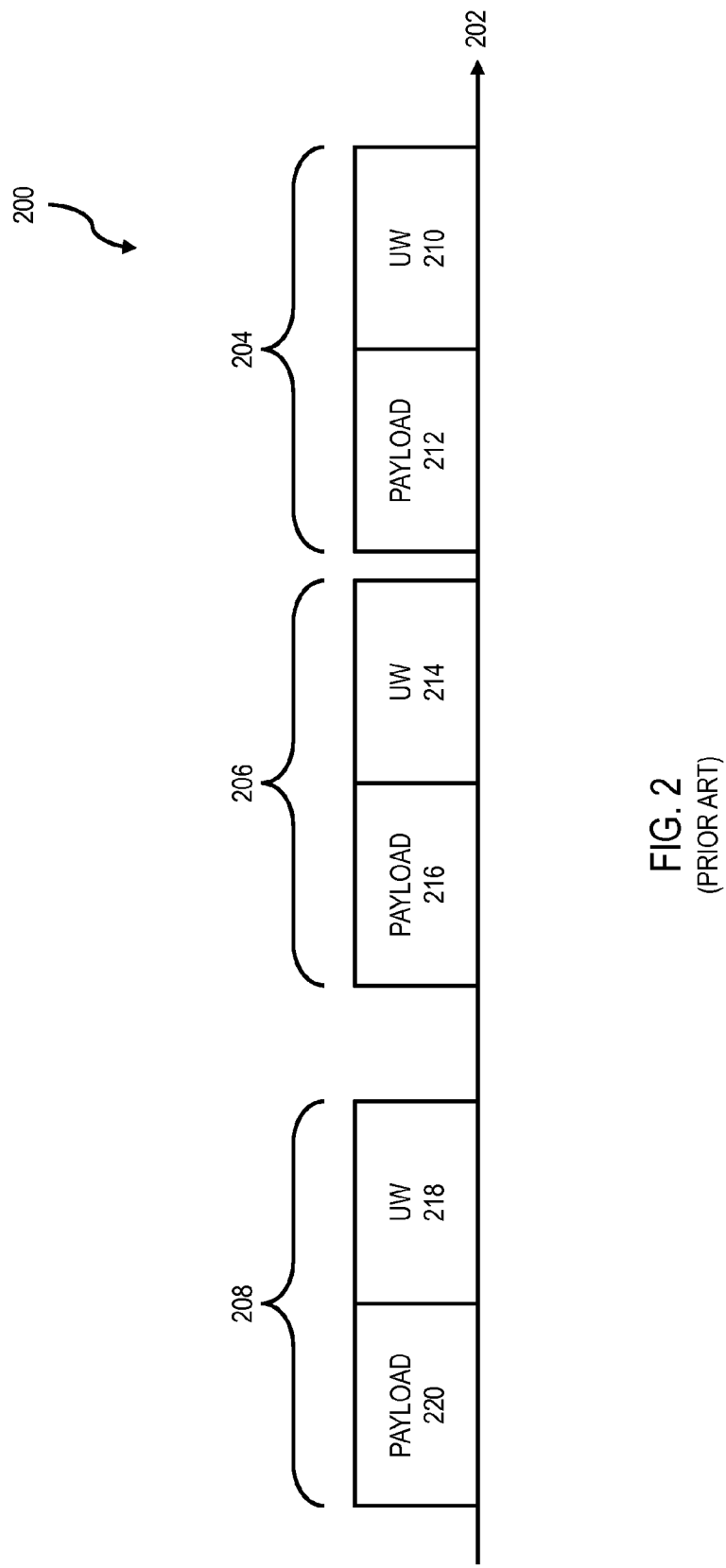
FIG. 2 illustrates a burst sequence for the conventional communication system of FIG. 1.
Figure 3:
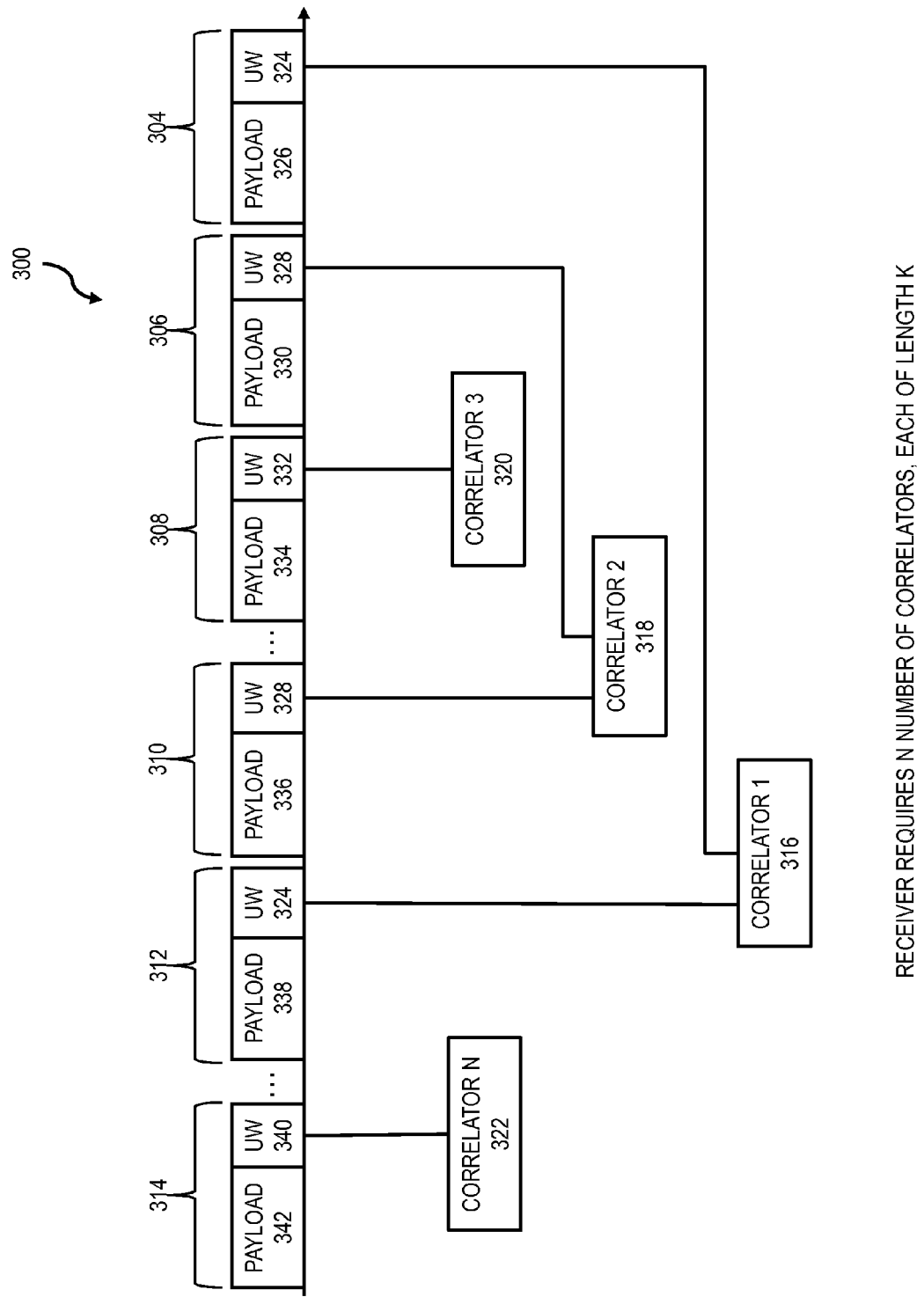
FIG. 3 illustrates a burst sequence with a set of UWs for the conventional communication system of FIG. 1.

The present invention provides a system and method of constructing a set of UWs such that the UWs within the set are related in some manner so as to simplify the correlation operation at the receiver thus providing efficient detection of the UWs.

Assuming that the number of UWs in a set are 'N', the total length of UW is 'K' and the length of each segment is 'L', the sets of UWs that will be generated in accordance with aspects of the invention will be related in a specific way that will allow efficient detection of the UWs.

In an example embodiment, let's consider a matrix H with 2 rows, formed by sub-vectors $A_0$ and $A_1$:

$$H = \begin{bmatrix} A_0 & A_1 \\ A_0 & -A_1 \end{bmatrix} \quad (1)$$

The sub-vectors $A_0$ and $A_1$ could have any desired length. Suppose the sub-vectors $A_0$ and $A_1$ have equal norm, i.e., $A_0^2 = A_1^2$. This implies that the rows of matrix H are orthogonal. The two row vectors of H can be used as two UW vectors. Thus, there are two UW vectors available, $|A_0|A_1|$ and $|A_0|-A_1|$, where | denotes concatenation. More importantly, these two UW vectors can both be detected using only one correlation of the received signal with the sub-vector $A_0$ and one correlation with the sub-vector $A_1$. Each of these sub-vectors has only half the length of the full UW length. Hence, two length K correlations can be achieved using two length K/2 correlators, 1 addition and 1 subtraction.

In general, in accordance with an aspect of the invention, a matrix can be constructed by choosing any UW vector $U=$where $U=[A_0|A_1| \ldots |A_{N-1}]$, the vector U is split into N equal parts. Next, an orthogonal N×N matrix $H_{N \times N}$ is chosen. A new matrix $H'_{N \times K}$ of N rows and K=NL columns is constructed, where L is the length of the sub-vector $A_x$, by simply repeating the elements in H horizontally, $H'_{x/y} = H_{x \lfloor y/L \rfloor}$ where $\lfloor y/L \rfloor$ denotes the least integer less than or equal to y/L.

As an example, suppose the set of N UW vectors consists of the columns of $H' \cdot V$, where "·" denotes the elementwise multiplication, and the matrix V has the form:

$$V = \begin{bmatrix} [A_0] & [A_0] & \ldots \\ [A_1] & [A_1] & \ldots \\ \vdots & \vdots & \\ [A_{N-1}] & [A_{N-1}] & \ldots \end{bmatrix}, \quad (2)$$

where $A_0, A_1 \ldots A_{N-1}$ are segments (each of length L) of the original vector U. Thus each of the columns in the matrix V is the original vector U.

For example, to obtain a set of 4 UWs, choosing a Walsh matrix H denoted as:

$$H = \begin{bmatrix} 1 & 1 & 1 & 1 \\ 1 & -1 & 1 & -1 \\ 1 & 1 & -1 & -1 \\ 1 & -1 & -1 & 1 \end{bmatrix}, \quad (3)$$

UW is represented as:

$$UW = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} A_0 & A_0 & A_0 & A_0 \\ A_1 & A_1 & A_1 & A_1 \\ A_2 & A_2 & A_2 & A_2 \\ A_3 & A_3 & A_3 & A_3 \end{bmatrix} = \quad (4)$$

$$\begin{bmatrix} A_0 & A_0 & A_0 & A_0 \\ A_1 & -A_1 & A_1 & -A_1 \\ A_2 & A_2 & -A_2 & -A_2 \\ A_3 & -A_3 & -A_3 & A_3 \end{bmatrix}$$

Each column of the matrix UW represents one UW vector, therefore, there are four UW vectors in the matrix UW. Note that in equation (4), each of the elements in the matrix H is repeated L times to obtain matrix UW, since each segment in the matrix V is length L.

Note that with the above construction, the number of vectors in the set will be the same as the number of segments. In order to take advantage of this construction to simplify the implementation, it is desirable for matrix H to have only elements from the set $[\pm 1, \pm i]$, where i denotes the imaginary number sqrt(−1). Examples of this type of matrix are Butson-Hadamard matrices H(2, N) and H(4, N). A Hadamard matrix, named after French mathematician Jacques Hadamard, is a square matrix whose entries are either +1 or −1 and whose rows are mutually orthogonal. A complex Hadamard matrix H of size N with all its columns (rows) mutually orthogonal, belongs to the Butson-type H(q, N) if all its elements are powers of q-th root of unity, i.e., $(H_{jk})^q = 1$ for j, k=1, 2, . . . , N. Note that H(2, N) are also known as a Hadamard or Walsh matrix. Walsh matrix is a sub-set of Butson Hadamard matrix with the property that the dot product of any two distinct rows (or columns) is zero.

As an example, consider a set of 2 UW of length K=4. This implies N=2 and the matrix H might be:

$$H = \begin{bmatrix} 1 & i \\ i & 1 \end{bmatrix} \quad (5)$$

The matrix H' would be:

$$H = \begin{bmatrix} 1 & 1 & i & i \\ i & i & 1 & 1 \end{bmatrix} \quad (6)$$

As an example, choosing any arbitrary length 4 for U, 2 different UWs are obtained as $H'U^T$. For example, assuming $U=[1, 1, 1, -1]$, set of 2 UWs of length 4 becomes:

$$H'U^T = \begin{bmatrix} 1 & 1 & i & -i \\ i & i & 1 & -1 \end{bmatrix} \quad (7)$$

An example embodiment of the method described above, in accordance with an aspect of the invention, is discussed below with the help of FIGS. 4A and 4B.

Figure 4A:
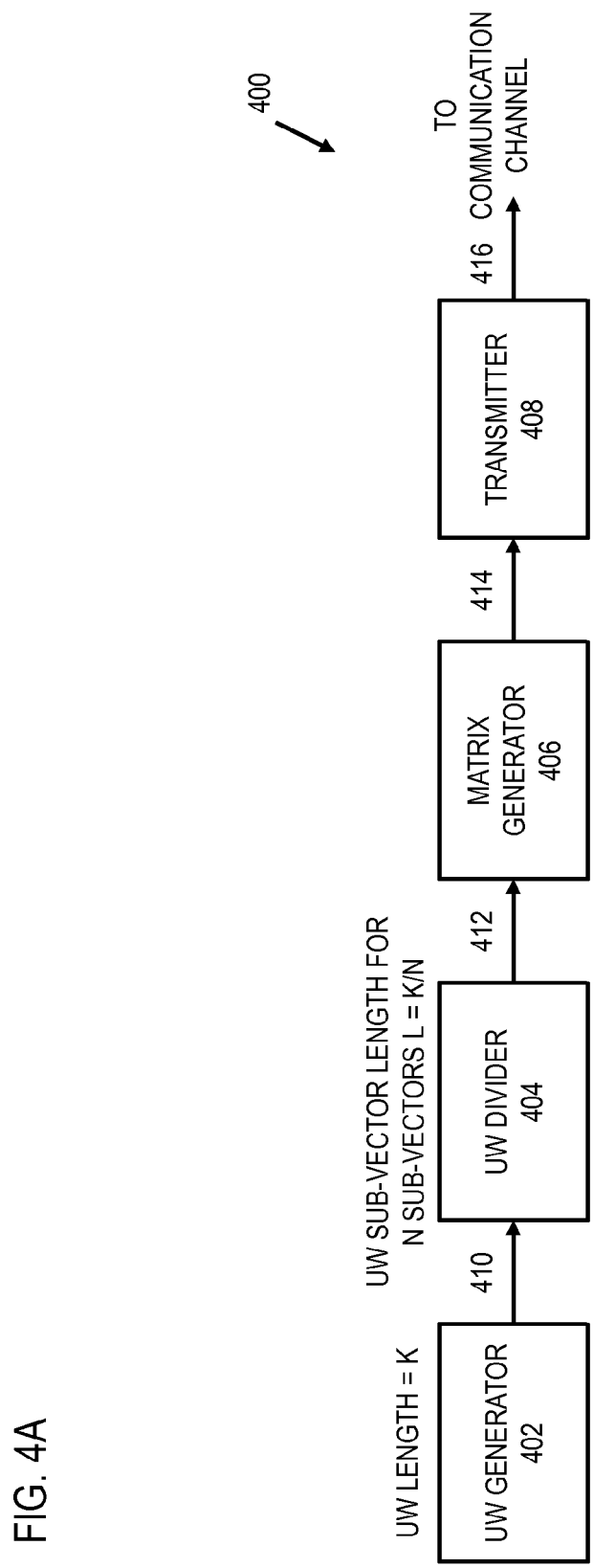
FIG. 4A illustrates a device to generate UW vectors for burst mode communication system, in accordance with an aspect of the invention.

FIG. 4A illustrates a device 400 to generate UW vectors for burst mode communication system, in accordance with an aspect of the invention.

As illustrated in the figure, device 400 includes a UW generator 402, a UW divider 404, a matrix generator 406 and a transmitter 408. In this example, UW generator 402, UW divider 404, matrix generator 406 and transmitter 408 are distinct elements. However, in some embodiments, at least two of UW generator 402, UW divider 404, matrix generator 406 and transmitter 408 may be combined as a unitary element. In some embodiments, at least one of UW generator 402, UW divider 404, matrix generator 406 or transmitter 408 may be implemented as a computer having stored therein tangible, non-transitory, computer-readable media for carrying or having computer-executable instructions or data structures stored thereon. Such tangible, non-transitory, computer-readable media can be any available media that can be accessed by a general purpose or special purpose computer. Non-limiting examples of tangible, non-transitory, computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a tangible, non-transitory, computer-readable medium. Thus, any such connection is properly termed a tangible, non-transitory, computer-readable medium. Combinations of the above should also be included within the scope of tangible, non-transitory, computer-readable media.

UW generator 402 can create an original UW vector having a symbol length K. As an example, UW vector $U = [A_0|A_1| \ldots |A_{N-1}]$ having symbol length K is created by UW generator 402 and provided to UW divider 404 via a signal 410.

UW divider 404 can receive the unique UW vector from UW generator 402 and divide it into N parts such that each of the N parts of the original UW has a length L. Therefore, Symbol length K of the original UW vector is equal to N×L. UW divider 404 provides the divided UW vector to matrix generator 406 via a signal 412.

Matrix generator 406 can receive the divided UW vector from UW divider 404 and can provide a matrix of UW vectors. Matrix generator 406 is further explained with the help of FIG. 4B.

Transmitter 408 can receive a matrix of UW vectors from matrix generator 406 via a signal 414 and can transmit the UW vectors to communication channel 106.

Figure 4B:
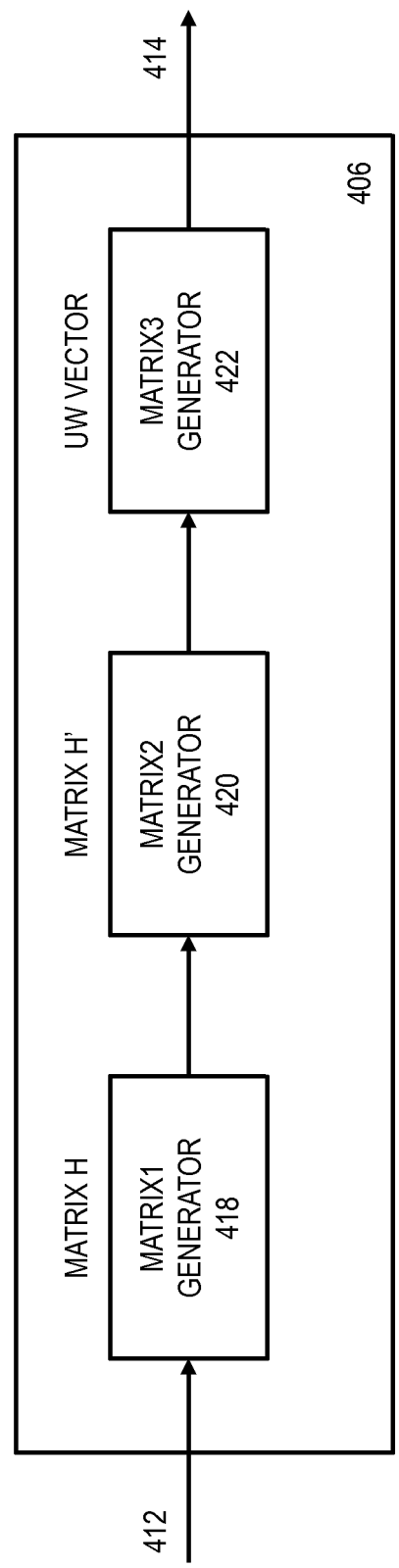
FIG. 4B illustrates an example matrix generator, in accordance with an aspect of the invention.

FIG. 4B illustrates matrix generator 406 in detail, in accordance with an aspect of the invention.

As illustrated in the figure, matrix generator 406 includes a matrix generator 418, a matrix generator 420, and a matrix generator 422. In this example, matrix1 generator 418, matrix generator 420, and matrix generator 422 are distinct elements. However, in some embodiments, at least two of matrix generator 418, matrix generator 420, and matrix generator 422 may be combined as a unitary element.

Matrix1 generator 418 can receive divided UW vector via signal 412 and can create an orthogonal N×N matrix $H_{N \times N}$. An example $H_{N \times N}$ matrix for K=4 and N=2 is represented by equation (5), as discussed earlier.

Matrix2 generator 420 can receive the orthogonal $H_{N \times N}$ matrix via a signal 424 and can generate a second matrix $H'_{N \times K}$. An example $H'_{N \times K}$ matrix for K=4 and N=2 is represented by equation (6), as discussed earlier.

Matrix3 generator 422 can receive the second matrix $H'_{N \times K}$ via a signal 426 and can generate a matrix of unique word vectors UW, as represented by equation (5). UW vectors are provided to transmitter 408 via signal 414 for transmission to communication channel 106.

As described above with reference to FIGS. 4A and 4B, a method of constructing a set of UWs in accordance with aspects of the invention first divides a set of UW in to N segments of length L=K/N, where K is the UW length. Next, an orthogonal matrix with N rows and K=NL columns is constructed in order to generate a UW vector. A burst sequence carrying this UW vector is received at the receiver that simplifies the design of receiver. The receiver no longer needs to use N number of correlators, each of length K, to detect the N possible UWs. Only N correlators, each of length L, are required instead of length K.

Note that the total computational complexity of these N correlations is the same as the single correlation of length K. Now the N outputs of the N correlations are obtained by combining the outputs of the N sub-correlations in various ways, according to the orthogonal matrix. In one embodiment, the choice of Butson Hadamard matrices allows this combination to consist of only addition and subtraction.

Referring back to the example of $U=[1, 1, 1, -1]$, only two correlations are required: one with coefficient [1, 1] and a second one with coefficients [1, -1]. Assuming the outputs of these correlations are called $c_0, c_1$. Referring back to equation (7), correlation with the first UW is $c_0+ic_1$ and the correlation with the second UW is $ic_0+c_1$.

It is desirable to minimize the auto-correlation and cross-correlation properties of the constructed UW vectors. Auto-correlation implies the correlation of a UW vector with the delayed version of itself over successive time intervals. Cross-correlation implies the correlation between the different vectors within the UW set.

Note that there is no guarantee that the UW constructed in accordance with aspects of the invention will have desirable auto and cross correlation properties. Some search techniques may be used to find good sets of UWs. For example, H may first be chosen and then a vector U may be determined that results in desirable properties. However, it is guaranteed that the set of UWs can be detected efficiently.

Finally, the correlation at the receiver with each of the UW in the set consists of two steps. First, N sub-correlations of the N segments of the vector U with the segments of the (suitably delayed) received signal is performed. Then the N different outputs are obtained as $Z=HC^T$, where $C=[C_0 \ldots C_{N-1}]$ is the vector of correlated outputs. This is explained with the help of FIG. 5.

Figure 5:
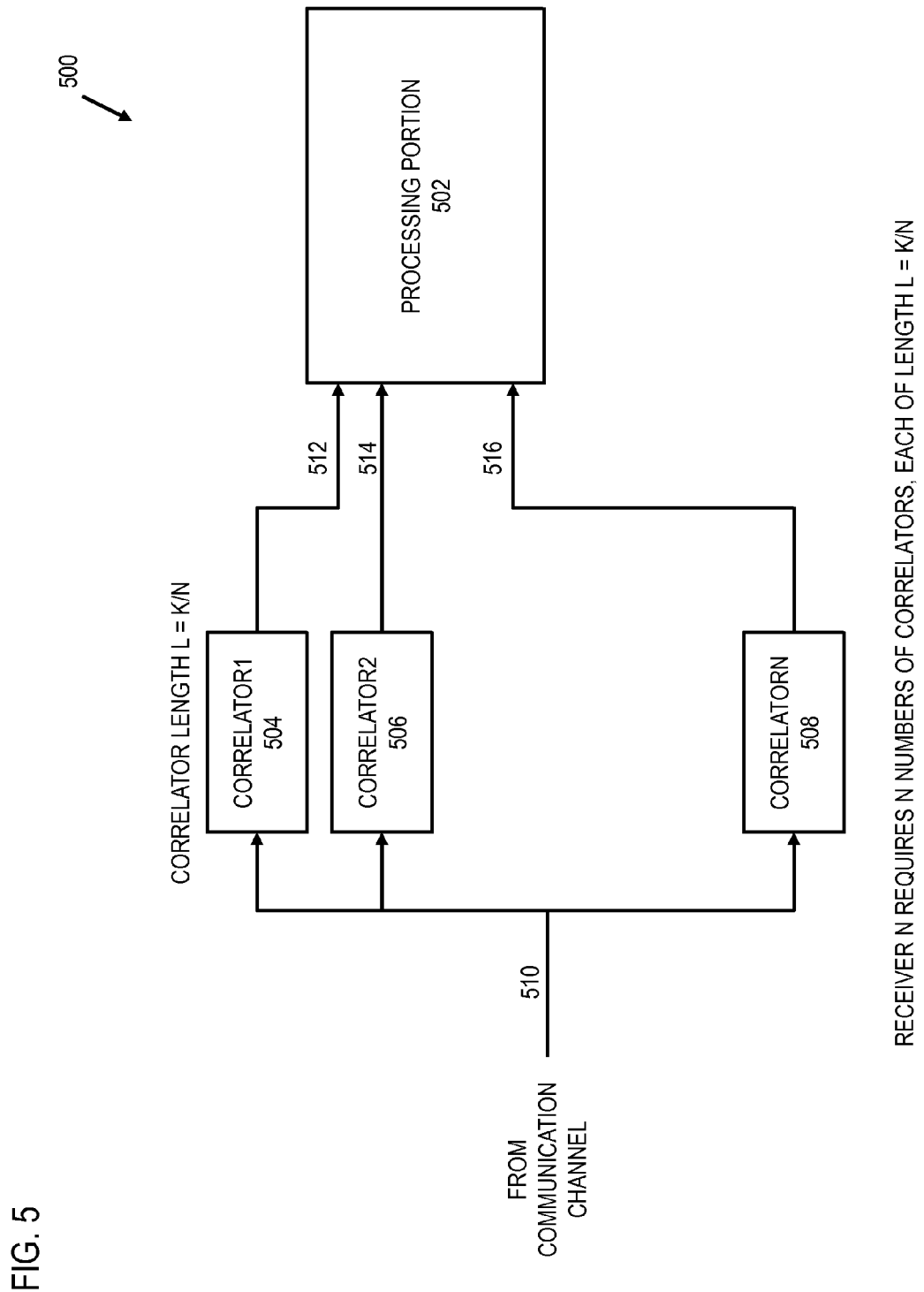
FIG. 5 illustrates an example embodiment of a receiver for detection of UW vectors, in accordance with an aspect of the invention.

FIG. 5 illustrates an example embodiment of a receiver for detection of UW vectors, in accordance with an aspect of the invention.

As illustrated in the figure, a receiver 500 includes a processing portion 502 and a set of correlators including a correlator 504, a correlator 506, a plurality of additional correlators indicated by dots and a correlator 508. In this example, processing portion 502, correlator 504, correlator 506, the plurality of additional correlators indicated by dots and correlator 508 are distinct elements. However, in some embodiments, at least two processing portion 502, correlator 504, correlator 506, the plurality of additional correlators indicated by dots and correlator 508 may be combined as a unitary element.

Each of correlator 504, correlator 506, the plurality of additional correlators indicated by dots and correlator 508 is operable to receive N segments of the U vector via a signal 510 from a communication channel. Each correlator is operable, to correlate a respective one of the unique word vectors UW to generate a vector of correlator outputs C, wherein $C=[c_0 \ldots c_{n-1}]$. In one embodiment, N sub-correlations of the N segments of vector U with the segments of the suitably delayed received segments are performed.

Processing portion 502 is operable to receive a correlator output signal 512 from correlator 504, a correlator output signal 514 from correlator 506, a plurality of additional correlator output signals indicated by dots from the respective plurality of additional correlators indicated by dots and a correlator output signal 516 from correlator 508. Processing portion 502 is operable to generate N outputs as $Z=HC^T$.

Aspects of the invention include a method of construction of UW sets together with an efficient method of implementing correlations with the members of the set. The set of UWs is constructed by breaking a UW sequence (vectors) in to equal length segments, and then multiplying this vector by an orthogonal matrix (matrix with orthogonal rows). First an arbitrary vector U is chosen of length K for a set of N UWs. Then a matrix H of size N×N is chosen. The columns of H are then repeated L times to form the matrix H' as illustrated in the previous example.

The method, as described above, in accordance with aspects of the invention, provides great benefits where sets of UWs are used such that the receiver docs not know a priori which of the UWs to expect at any given time and must perform a parallel detection of all the candidates. The computational savings offered by the proposed method can be quite significant. In the case when N UWs are needed, the savings in computation are almost a factor of N.

The tradeoff is that finding sets of UW with desirable auto and cross correlation properties is more difficult with the proposed method of construction. However, in many cases, this tradeoff is acceptable.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device comprising:
   a signal generator processor configured to generate an initial unique word vector signal comprising a symbol sequence of length K symbols;
   a divider module configured to receive the initial unique word vector and to divide the initial unique word vector into N equal segments (each of length L);
   a matrix generator module configured: to receive the initial unique word vector divided into the N equal segments; to generate an orthogonal N×N first matrix $H_{N \times N}$; to generate a second matrix $H'_{N \times N}$, wherein each column comprises a repetition of the N segments of the initial unique word vector (each segment being placed in a respective row of the column); and to generate a third matrix $UW_{N \times K}$, resulting from an entrywise multiplication of each element of the first matrix by the respective element (unique word segment) of the second matrix; and
   wherein each column of the third matrix reflects a distinct unique word vector, wherein one column reflects the initial unique word vector, and the distinct unique word vectors of the third matrix are orthogonal to each other.

2. The device of claim 1, wherein the second matrix comprises a square matrix having entries of either +1 or −1, and wherein its rows or columns are mutually orthogonal (a Hadamard matrix).

3. The device of claim 1, wherein the second matrix comprises a square matrix with dimensions of a power of 2 and entries of either +1 or −1, and wherein the dot product of any two rows or columns of the matrix equals zero (a Walsh matrix).

4. The device of claim 1, wherein the second matrix comprises a matrix H(q, N) of size N, with all entries being $q^{th}$ roots of unity, $([H]_{j,k})^q = 1$, j, k=1, 2, ..., N (a Butson-type Hadamard matrix).

5. A method comprising:
   generating, via a signal generator processor, an initial unique word vector signal comprising a symbol sequence of length K symbols;
   dividing the initial unique word vector into N equal segments (each of length L);
   generating an orthogonal N×N first matrix $H_{N \times N}$;
   generating a second matrix $H'_{N \times N}$, wherein each column comprises a repetition of the N segments of the initial unique word vector (each segment being placed in a respective row of the column);
   generating a third matrix $UW_{N \times K}$ by entrywise multiplication of each element of the first matrix by the respective element (unique word segment) of the second matrix; and
   wherein each column of the third matrix reflects a distinct unique word vector, wherein one column reflects the initial unique word vector, and the distinct unique word vectors of the third matrix are orthogonal to each other.

6. The method of claim 5, wherein the second matrix comprises a square matrix having entries of either +1 or −1, and wherein its rows or columns are mutually orthogonal (a Hadamard matrix).

7. The method of claim 5, wherein the second matrix comprises a square matrix with dimensions of a power of 2 and entries of either +1 or −1, and wherein the dot product of any two rows or columns of the matrix equals zero (a Walsh matrix).

8. The method of claim 5, wherein the second matrix comprises a matrix H(q,N) of size N, with all entries being $q^{th}$ roots of unity, $([H]_{j,k})^q = 1$, j, k=1, 2, ..., N (a Butson-type Hadamard matrix).

* * * * *